United States Patent
Hill

(10) Patent No.: US 10,683,811 B2
(45) Date of Patent: Jun. 16, 2020

(54) COMBUSTION STAGING SYSTEM

(71) Applicant: ROLLS-ROYCE plc, London (GB)

(72) Inventor: Ralph Hill, Matlock (GB)

(73) Assignee: ROLLS-ROYCE plc, London (GB)

( * ) Notice: Subject to any disclaimer, the term of this patent is extended or adjusted under 35 U.S.C. 154(b) by 392 days.

(21) Appl. No.: 15/427,932

(22) Filed: Feb. 8, 2017

(65) Prior Publication Data

US 2017/0298839 A1 Oct. 19, 2017

(30) Foreign Application Priority Data

Mar. 10, 2016 (GB) .................................. 1604120.4

(51) Int. Cl.
*F02C 9/46* (2006.01)
*F02C 7/232* (2006.01)
(Continued)

(52) U.S. Cl.
CPC .............. *F02C 9/46* (2013.01); *F01D 21/003* (2013.01); *F02C 7/14* (2013.01); *F02C 7/222* (2013.01);
(Continued)

(58) Field of Classification Search
CPC ...... F02C 7/12; F02C 7/14; F02C 7/22; F02C 7/222; F02C 7/228; F02C 7/232;
(Continued)

(56) References Cited

U.S. PATENT DOCUMENTS 4,491,272 A * 1/1985 Bradley .................. F23D 11/26
  239/104
5,402,634 A  4/1995 Marshall
(Continued)

FOREIGN PATENT DOCUMENTS

EP      1344916 A2    9/2003
EP    1 988 267 A2   11/2008
(Continued)

OTHER PUBLICATIONS

U.S. Appl. No. 15/430,085, filed Feb. 10, 2017 in the name of Stevenson et al.
(Continued)

*Primary Examiner* — Arun Goyal
(74) *Attorney, Agent, or Firm* — Oliff PLC

(57) ABSTRACT

A combustion staging system for fuel burners of a multi-stage combustor of a gas turbine engine is provided. The system has pilot and mains fuel manifolds respectively distributing fuel to pilot and mains stages of the burners. The system further has a plurality of check valves through which the mains manifold feeds fuel to the respective burners. The check valves are arranged to open when the fuel pressure within the mains manifold exceeds a predetermined fuel pressure relative to gas pressure in the combustor. The system further has a splitting unit which receives a metered fuel flow and controllably splits the received fuel flow into pilot and mains flows which are sent respectively to the pilot and mains fuel manifolds to perform staging control of the combustor. The splitting unit is operable to select the pilot manifold and to deselect the mains manifold for pilot-only operation in which there is a pilot supply to the combustor but no mains supply to the combustor from the burners. It is also operable to select both the pilot and mains manifolds for pilot and mains operation in which there are pilot and mains supplies to the combustor from the burners. The system further has a cooling flow recirculation line having a delivery section arranged to provide a cooling flow of fuel to the mains manifold when that manifold is deselected so that the deselected mains manifold remains primed with relatively cool fuel, and a return section arranged to collect the cooling flow from the mains manifold. The system further has a gas pressure sensor configured to measure gas pressure in the combustor, a speed sensor which measures a rotation speed
(Continued)

of a rotor of the engine, and a control unit which, when the mains manifold is deselected for pilot-only operation, (i) compares the measured rotation speed with a predicted rotation speed for the metered fuel flow, and compares the measured gas pressure with a predicted gas pressure for the metered fuel flow, and (ii) is adapted to close off the recirculation line when the results of these comparisons are indicative of leakage of fuel from the cooling fuel flow into the combustor through one or more of the check valves.

6 Claims, 8 Drawing Sheets

(51) Int. Cl.
F02C 7/228 (2006.01)
F01D 21/00 (2006.01)
F02C 7/14 (2006.01)
F02C 7/22 (2006.01)
F02C 9/26 (2006.01)
F23R 3/34 (2006.01)

(52) U.S. Cl.
CPC .............. *F02C 7/228* (2013.01); *F02C 7/232* (2013.01); *F02C 9/263* (2013.01); *F23R 3/343* (2013.01); *F23R 3/346* (2013.01); F05D 2220/32 (2013.01); F05D 2240/35 (2013.01); F05D 2260/80 (2013.01)

(58) Field of Classification Search
CPC .... F02C 9/263; F02C 9/34; F02C 9/46; F23R 3/28; F23R 3/283; F23R 3/343; F23R 3/346
See application file for complete search history.

(56) References Cited

U.S. PATENT DOCUMENTS

| | | | |
|---|---|---|---|
| 5,735,117 A | 4/1998 | Toelle | |
| 5,899,073 A * | 5/1999 | Akimaru | F02C 3/22 60/39.465 |
| 8,173,315 B2 * | 5/2012 | Yoshida | H01M 8/04432 429/443 |
| 9,404,423 B2 * | 8/2016 | Griffiths | F02C 7/228 |
| 9,650,882 B2 * | 5/2017 | Zhang | E21B 47/0007 |
| 10,337,945 B2 * | 7/2019 | Blumrich | B64D 37/005 |
| 2010/0263755 A1 | 10/2010 | Taylor et al. | |
| 2012/0167594 A1 * | 7/2012 | Poisson | F02C 9/36 60/803 |
| 2013/0042920 A1 | 2/2013 | Snodgrass et al. | |
| 2013/0061599 A1 | 3/2013 | Van Alen | |
| 2013/0259088 A1 | 10/2013 | Bellis et al. | |
| 2015/0027100 A1 | 1/2015 | Qin et al. | |
| 2016/0245524 A1 | 8/2016 | Hill | |

FOREIGN PATENT DOCUMENTS

| | | |
|---|---|---|
| EP | 2141340 A2 | 1/2010 |
| EP | 2339147 A2 | 6/2011 |
| EP | 2469057 A1 | 6/2012 |
| EP | 3070408 A1 | 9/2016 |
| GB | 2523126 A | 8/2015 |
| WO | 2013/036392 A1 | 3/2013 |
| WO | 2015/112515 A1 | 7/2015 |

OTHER PUBLICATIONS

U.S. Appl. No. 15/428,005, filed Feb. 8, 2017 in the name of Thompson et al.
Apr. 26, 2019 U.S. Office Action issued U.S. Appl. No. 15/428,005.
May 13, 2019 Office Action issued in U.S. Appl. No. 15/430,085.

* cited by examiner

COMBUSTION STAGING SYSTEM

FIELD OF THE INVENTION

The present invention relates to a combustion staging system for fuel burners of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel burners have pilot and mains fuel manifolds feeding pilot and mains discharge orifices of the burners. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging.

A typical annular combustor has a circumferential arrangement of fuel burners, each associated with respective pilot and mains feeds extending from the circumferentially extending pilot and mains manifolds. Each burner generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the burners, a check valve, known as a fuel flow scheduling valve (FSV), is typically associated with each feed. The FSVs prevent fuel flow into the burner nozzle when the differential between the supply pressure and the combustion chamber pressure is less than a cracking pressure.

Multi-stage combustors may have further stages and/or manifolds. For example, the pilot manifold may be split into two manifolds for lean blow-out prevention.

During pilot-only operation, the splitter valve directs fuel for burning flows only through the pilot fuel circuit (i.e. pilot manifold and feeds). It is therefore conventional to control temperatures in the stagnant (i.e. mains) fuel circuit to prevent coking due to heat pick up from the hot engine casing. One known approach, for example, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

However, a problem associated with this approach is how to accommodate a mains check valve failing to an open condition. In pilot-only operation, when cooling flow is passing through the mains manifold, such a failure can cause hot streaks which may lead to nozzle and turbine damage. In pilot and mains operation, such a failure can produce a drop in mains manifold pressure which causes other mains check valves to close. A possible outcome is again hot streaks leading to nozzle and turbine damage.

SUMMARY

In a first aspect, the present invention provides a combustion staging system for fuel burners of a multi-stage combustor of a gas turbine engine, the system having:

pilot and mains fuel manifolds respectively distributing fuel to pilot and mains stages of the burners;

a plurality of check valves through which the mains manifold feeds fuel to the respective burners, the check valves being arranged to open when the fuel pressure within the mains manifold exceeds a predetermined fuel pressure relative to gas pressure in the combustor;

a splitting unit which receives a metered fuel flow and controllably splits the received fuel flow into pilot and mains flows which are sent respectively to the pilot and mains fuel manifolds to perform staging control of the combustor, the splitting unit being operable to select the pilot manifold and to deselect the mains manifold for pilot-only operation in which there is a pilot supply to the combustor but no mains supply to the combustor from the burners, and being operable to select both the pilot and mains manifolds for pilot and mains operation in which there are pilot and mains supplies to the combustor from the burners; and a cooling flow recirculation line having a delivery section arranged to provide a cooling flow of fuel to the mains manifold when that manifold is deselected so that the deselected mains manifold remains primed with relatively cool fuel, and a return section arranged to collect the cooling flow from the mains manifold;

wherein the system further has:

a gas pressure sensor configured to measure gas pressure in the combustor;

a speed sensor which measures a rotation speed of a rotor of the engine; and a control unit which, when the mains manifold is deselected for pilot-only operation, (i) compares the measured rotation speed with a predicted rotation speed for the metered fuel flow, and compares the measured gas pressure with a predicted gas pressure for the metered fuel flow, and (ii) is adapted to close off the recirculation line when the results of these comparisons are indicative of leakage of fuel from the cooling fuel flow into the combustor through one or more of the check valves.

Advantageously, the speed measurement generally has a high level of accuracy and reliability. The gas pressure measurement may lag the speed measurement, but typically the lag is short enough for closure of the recirculation line before significant damage to the engine occurs. By relying on two independent measurements (speed and pressure), whose characteristics are defined, the reliability of the method is improved.

In respect of the comparison of the measured rotation speed with a predicted rotation speed for the metered fuel flow, the result of the comparison indicative of leakage may be an increase in the second derivative of rotation speed relative to that of a predicted temporal speed profile of the rotor for the metered fuel flow. For example, when the predicted temporal speed profile is a steady state profile (i.e. zero acceleration over time), an increase in the second derivative of rotation speed indicative of leakage can manifest itself by an acceleration. As another example, when the predicted temporal speed profile is an acceleration transient, an increase in the second derivative of rotation speed indicative of leakage can manifest itself by an increase in acceleration. As yet another example, when the predicted temporal speed profile is a deceleration transient, an increase in the second derivative of rotation speed indicative of leakage can manifest itself by a reduction in deceleration.

In respect of the comparison of the measured gas pressure with a predicted gas pressure for the metered fuel flow, the result of the comparison indicative of leakage may be a reduction in the ratio of the metered fuel flow to the measured gas pressure relative to a predicted ratio of the metered fuel flow to the gas pressure in the combustor.

The system may further have: a first fuel pressure sensor which measures the fuel pressure in the return section, and a second fuel pressure sensor which measures the fuel pressure in the delivery section. In this case, when the mains manifold is deselected for pilot-only operation, the control unit may (i) compare the measured fuel pressure in the return section with the measured fuel pressure in the delivery section, and (ii) be adapted to close off the recirculation line only when the result of the fuel pressure comparison is also indicative of leakage of fuel from the cooling fuel flow into the combustor through one or more of the check valves. Thus the fuel pressure comparison can be used to provide confirmation of the leakage detection by the measured gas pressure and measured rotation speed.

Advantageously, the first and second fuel pressure sensors can also be used to detect for blockages in the recirculation line, which blockages can be problematic if they allow combustion gas ingress into the mains manifold during pilot-only operation.

However, more generally, the decision to close off the recirculation line can be based primarily on such measured fuel pressures. Accordingly, in a second aspect, the present invention provides a combustion staging system for fuel burners of a multi-stage combustor of a gas turbine engine, the system having:
- pilot and mains fuel manifolds respectively distributing fuel to pilot and mains stages of the burners;
- a plurality of check valves through which the mains manifold feeds fuel to the respective burners, the check valves being arranged to open when the fuel pressure within the mains manifold exceeds a predetermined fuel pressure relative to gas pressure in the combustor;
- a splitting unit which receives a metered fuel flow and controllably splits the received fuel flow into pilot and mains flows which are sent respectively to the pilot and mains fuel manifolds to perform staging control of the combustor, the splitting unit being operable to select the pilot manifold and to deselect the mains manifold for pilot-only operation in which there is a pilot supply to the combustor but no mains supply to the combustor from the burners, and being operable to select both the pilot and mains manifolds for pilot and mains operation in which there are pilot and mains supplies to the combustor from the burners; and
- a cooling flow recirculation line having a delivery section arranged to provide a cooling flow of fuel to the mains manifold when that manifold is deselected so that the deselected mains manifold remains primed with relatively cool fuel, and a return section arranged to collect the cooling flow from the mains manifold;
- wherein the system further has:
- a first fuel pressure sensor which measures the fuel pressure in the return section, and a second fuel pressure sensor which measures the fuel pressure in the delivery section; and
- a control unit which, when the mains manifold is deselected for pilot-only operation, (i) compares the measured fuel pressure in the return section with the measured fuel pressure in the delivery section, and (ii) is adapted to close off the recirculation line when the result of the fuel pressure comparison is indicative of leakage of fuel from the cooling fuel flow into the combustor through one or more of the check valves.

In the second aspect, the system may further have a gas pressure sensor configured to measure gas pressure in the combustor or a speed sensor which measures a rotation speed of a rotor of the engine. The measured gas pressure or the measured rotation speed can then be compared with the predicted gas pressure or rotation speed for metered fuel flow and used to confirm the result of the fuel pressure comparison, or indeed a simple reduction in the measured gas pressure can be used to confirm the result of the fuel pressure comparison. Thus the control unit may be adapted to close off the recirculation line only when the fuel pressure comparison indicative of leakage is supplemented by a corresponding reduction in the ratio of the metered fuel flow to the measured gas pressure relative to a predicted ratio of the metered fuel flow to the gas pressure in the combustor, or by a corresponding reduction in the measured gas pressure. Alternatively, the control unit may be adapted to close off the recirculation line only when the fuel pressure comparison indicative of leakage is supplemented by a corresponding increase in the second derivative of rotation speed relative to that of a predicted temporal speed profile of the rotor for the metered fuel flow.

In the first or second aspect, the result of the fuel pressure comparison indicative of leakage may be a reduction by more than a predetermined amount of the measured fuel pressure in the return section relative to the measured fuel pressure in the delivery section.

In the first or second aspect, when the mains manifold is selected for pilot and mains operation, the control unit may (i) monitor either or both measured fuel pressures, and (ii) be adapted to issue an alert signal that a check valve has failed open when the, or each, measured fuel pressure is indicative of failure of one or more of the check valves to regulate mains flow into the combustor. Thus advantageously, the first and second fuel pressure sensors can also warn of check valve failure during pilot and mains operation. On receipt of the alert signal, a suitable operator response can be to pull back the engine and/or turn mains off (i.e. switch to pilot-only operation).

Indeed, more generally, in a third aspect, the present invention provides a combustion staging system for fuel burners of a multi-stage combustor of a gas turbine engine, the system having:
- pilot and mains fuel manifolds respectively distributing fuel to pilot and mains stages of the burners;
- a plurality of check valves through which the mains manifold feeds fuel to the respective burners, the check valves being arranged to open when the fuel pressure within the mains manifold exceeds a predetermined fuel pressure relative to gas pressure in the combustor;
- a splitting unit which receives a metered fuel flow and controllably splits the received fuel flow into pilot and mains flows which are sent respectively to the pilot and mains fuel manifolds to perform staging control of the combustor, the splitting unit being operable to select the pilot manifold and to deselect the mains manifold for pilot-only operation in which there is a pilot supply to the combustor but no mains supply to the combustor from the burners, and being operable to select both the pilot and mains manifolds for pilot and mains operation in which there are pilot and mains supplies to the combustor from the burners; and
- a cooling flow recirculation line having a delivery section arranged to provide a cooling flow of fuel to the mains manifold when that manifold is deselected so that the deselected mains manifold remains primed with relatively cool fuel, and a return section arranged to collect the cooling flow from the mains manifold;

wherein the system further has:

a first fuel pressure sensor which measures the fuel pressure in the return section, and/or a second fuel pressure sensor which measures the fuel pressure in the delivery section; and a control unit which, when the mains manifold is selected for pilot and mains operation, (i) monitors the, or each, measured fuel pressure, and (ii) is adapted to issue an alert signal that a check valve has failed open when the, or each, measured fuel pressure is indicative of failure of one or more of the check valves to regulate mains flow into the combustor.

In the third aspect, the system may further have a gas pressure sensor configured to measure gas pressure in the combustor, and the control unit may be adapted to issue an alert only when the indication of check valve failure is supplemented by a corresponding change in the ratio of the metered fuel flow to the measured gas pressure in the combustor relative to a predicted ratio of the metered fuel flow to the gas pressure in the combustor. For example, dependent upon the location of the gas pressure measurement and the check valve failure, the measured gas pressure can have a reduction e.g. due to the localised flow increase through the burner with the failed check valve, or reduction of flow in the other burners with a corresponding drop in combustion gas pressure. As the system of the first aspect has such a gas pressure sensor, and the system of the second aspect optionally has such a gas pressure sensor, the control unit of each of these systems may similarly be adapted to issue an alert only when the indication of check valve failure is supplemented by a corresponding change in the ratio of the metered fuel flow to the measured gas pressure in the combustor relative to a predicted ratio of the metered fuel flow to the gas pressure in the combustor. In the first, second or third aspect, the indication of check valve failure may be a reduction by more than a predetermined amount of the, or each, measured fuel pressure.

In a fourth aspect, the present invention provides a gas turbine engine having the combustion staging system according to any one of the first to third aspects.

Further optional features of the invention will now be set out. These are applicable singly or in any combination with any aspect of the invention.

Conveniently, the control unit can be part of an engine electronic controller.

The gas pressure sensor may be configured to measure gas pressure in the combustor indirectly, e.g. by measuring the gas pressure at the exit of the high pressure compressor of an engine. The high pressure compressor exit pressure is typically about the same as the combustor gas pressure, but is an easier parameter to measure due to the lower temperatures at this location than in the combustor.

The splitting unit may be a flow splitting valve.

The check valves may be fuel flow scheduling valves. Additionally or alternatively, they may be integrated check valves.

The cooling flow may enter the delivery section from a high pressure fuel zone of the engine and exit the return section to a low pressure fuel zone of the engine. The high pressure fuel zone may be downstream of a pumping unit of the engine. Typically the metered fuel flow derives from the same high pressure fuel zone. The low pressure fuel zone may be upstream of such a pumping unit. The cooling flow may enter the delivery section from the high pressure fuel zone of the engine at a cooling flow orifice and exit the return section to the low pressure fuel zone of the engine at a pressure raising orifice. The system may further include a fuel recirculating control valve on the delivery section adjacent the cooling flow orifice, the fuel recirculating control valve having an open position so that the cooling flow enters the delivery section at the cooling flow orifice during pilot-only operation, and a shut off position which prevents the cooling flow entering the delivery section through the cooling flow orifice during pilot and mains operation. The system may further include a recirculating flow return valve on the return section adjacent the pressure raising orifice, the recirculating flow return valve having an open position so that the cooling flow exits the return section at the pressure raising orifice during pilot-only operation, and a shut off position which prevents the cooling flow exiting the return section through the pressure raising orifice during pilot and mains operation. For example, the fuel recirculating control valve and the recirculating flow return valve may be operably connected such that when the fuel recirculating control valve moves to its open position the recirculating flow return valve likewise moves to its open position, and when the fuel recirculating control valve moves to its shut off position the recirculating flow return valve likewise moves to its shut off position.

The delivery section may include a recirculation manifold which distributes the cooling flow to the burners en route to the mains manifold. The delivery section may include a delivery pipe extending from e.g. the fuel recirculating control valve to the recirculation manifold.

A connection pipe for carrying the respective portion of metered flow may extend from the splitting unit to the mains manifold, and a branch pipe may branch off the connection pipe e.g. to the recirculating flow return valve. Conveniently, the return section of the cooling flow recirculation line may then include the branch pipe and the portion of the connection pipe from the mains manifold to the branch pipe.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
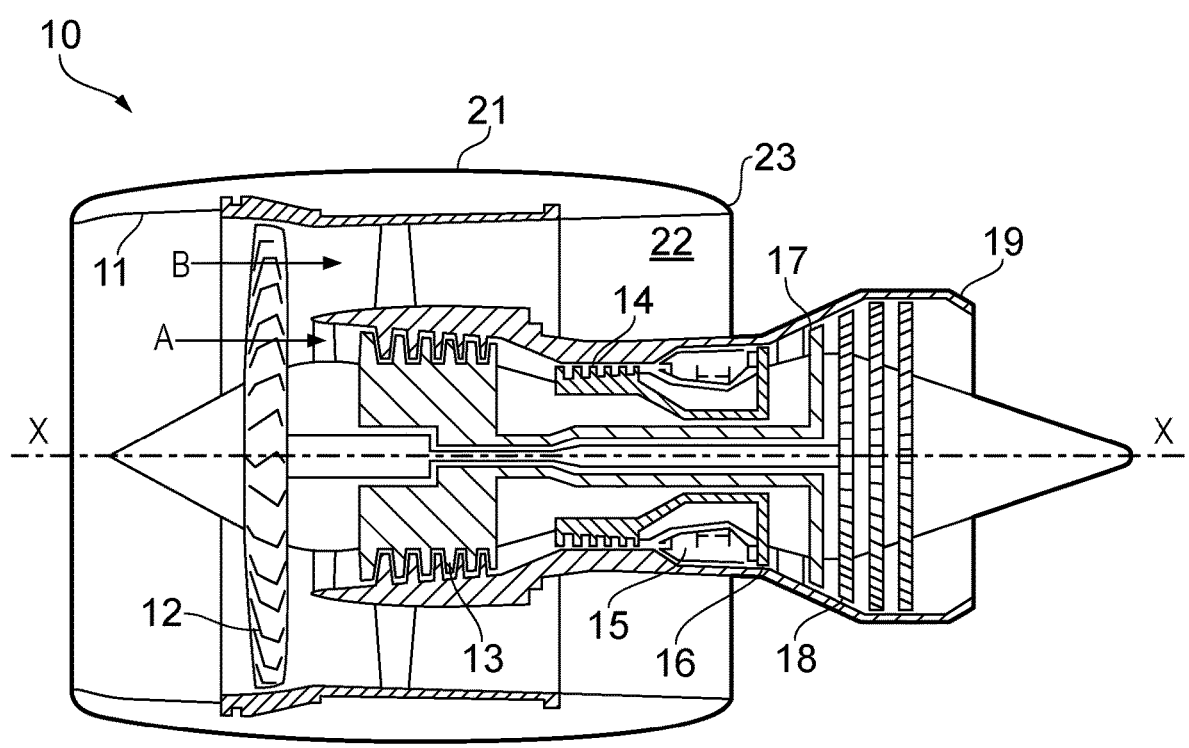
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a pumping unit comprising a low pressure (LP) pumping stage which draws fuel from a fuel tank of the aircraft and and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU further typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such as variable inlet guide vane or variable stator vane actuators) that receive fuel under pressure from the HMU. Further details of such an HMU are described in EP 2339147 A.

Figure 2:
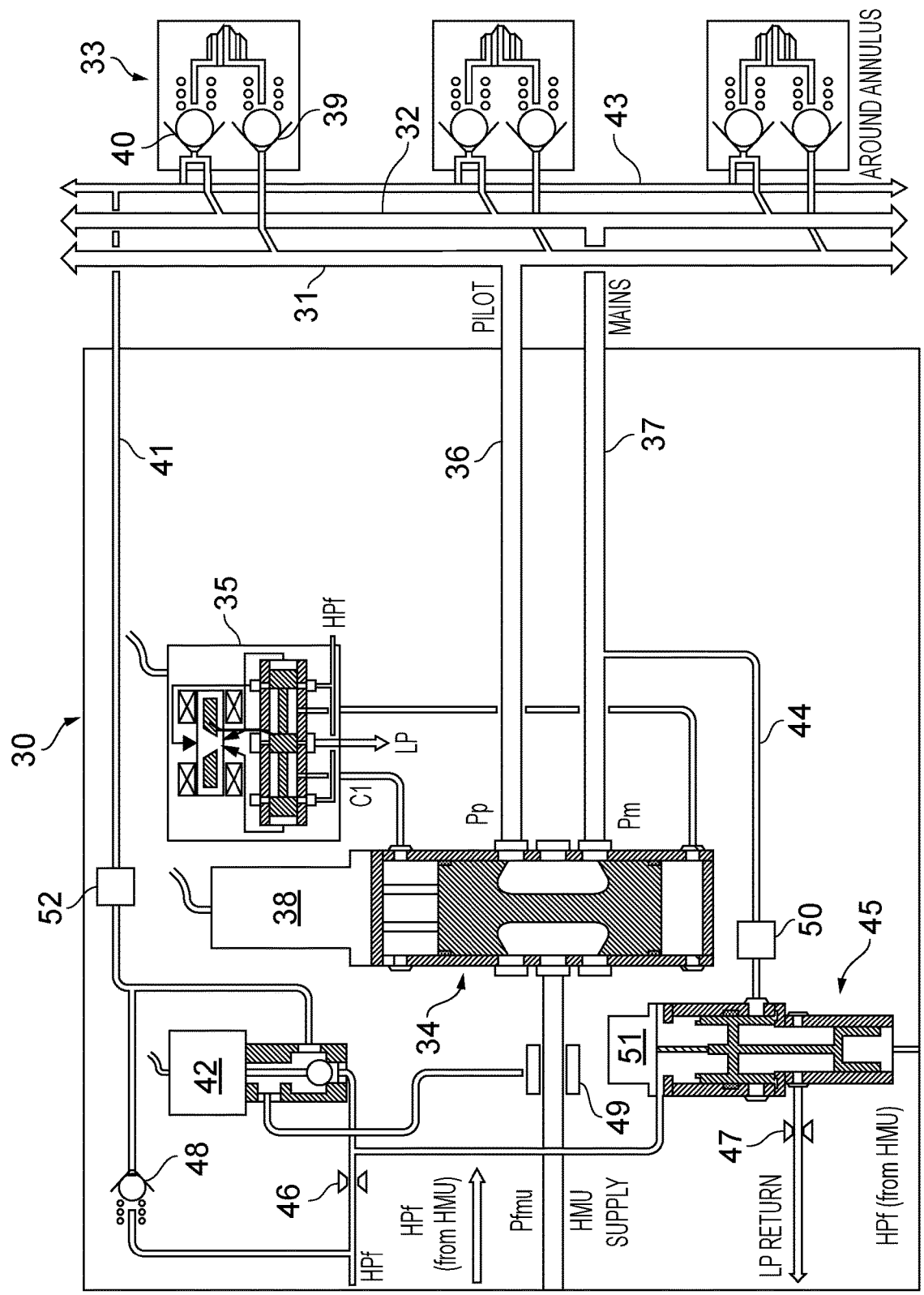
FIG. 2 shows schematically a staging system for fuel burners of the combustor of the engine of FIG. 1.

An engine electronic controller (EEC) commands the HMU fuel metering valve to supply fuel to the combustor at a given flow rate. The metered fuel flow leaves the HMU and arrives at a staging system 30, shown schematically in FIG. 2, at a pressure $P_{fmu}$. The staging system splits the fuel under the control of the EEC (not shown) into two flows: one at a pressure $P_p$ for a pilot manifold 31 and the other at a pressure $P_m$ for a mains manifold 32. The pilot manifold feeds pilot nozzles of a number of fuel burners 33 of the combustor. The mains manifold feeds secondary nozzles of the fuel burners. Pilot fuel flow scheduling valves (FSVs) 39 and mains FSVs 40 at the burners prevent fuel flow into the burner nozzles when the pressure differential across the FSVs is less than a cracking pressure. By varying the fuel split between the manifolds, the EEC can thus perform staging control of the engine.

In more detail, the staging system 30 has a fuel flow splitting valve (FFSV) 34, which receives the metered fuel flow from the HMU at pressure $P_{fmu}$. A spool is slidable within the FFSV under the control of a servo valve 35, the position of the spool determining the outgoing flow split between a pilot connection pipe 36 which delivers fuel to the pilot manifold 31 and a mains connection pipe 37 which delivers fuel to the mains manifold 32. The spool can be positioned so that the mains stage is deselected, with the entire metered flow going to the pilot stage. An LVDT 38 provides feedback on the position of the spool to the EEC, which in turn controls staging by control of the servo valve.

The staging system 30 also has a recirculation line to provide the mains manifold 32 with a cooling flow of fuel when mains manifold is deselected. The recirculation line has a delivery section including a delivery pipe 41 which receives the cooling flow from a fuel recirculating control valve (FRCV) 42, and a recirculation manifold 43 into which the delivery pipe feeds the cooling flow. The recirculation manifold has feeds which introduce the cooling flow from the recirculation manifold to the mains manifold via connections to the feeds from the mains manifold to the mains FSVs 40.

The recirculation line also has a return section which collects the returning cooling flow from the mains manifold 32. The return section is formed by a portion of the mains connection pipe 37 and a branch pipe 44 from the mains connection pipe, the branch pipe extending to a recirculating flow return valve (RFRV) 45 from whence the cooling flow exits the recirculation line.

The cooling flow for the recirculation line is obtained from the HMU at a pressure $HP_f$ via a cooling flow orifice (CFO) 46. On leaving the RFRV 45 via a pressure raising orifice (PRO) 47, the cooling flow is returned at a pressure $P_{lp}$ to the pumping unit for re-pressurisation by the HP pumping stage. A check valve 48 accommodates expansion of fuel trapped in the pilot and mains system during shutdown when the fuel expands due to combustor casing heat soak back. The check valve can be set to a pressure which prevents fuel boiling in the manifolds. The HMU also supplies fuel at pressure $HP_f$ for operation of the servo valve 35 and the RFRV 45. The FRCV 42 and the RFRV 45 are operated under the control of the EEC.

When the mains is staged in, a cooling flow is also directed through the recirculation manifold 43 to avoid coking therein. More particularly a small bypass flow is extracted from the HMU's metered fuel flow at pressure $P_{fmu}$. The bypass flow is sent via a flow washed filter 49 to a separate inlet of the FRCV 42, and thence through the delivery pipe 41 to the recirculation manifold 43. The bypass flow exits the recirculation manifold to rejoin the mains fuel flow at the burners 33.

Possible failure modes of the staging system 30 are:

(A) Failure of the cooling flow (e.g. by blockage in the recirculation line) which could allow combustion gas ingress to the mains manifold 32 when staged out, and potential return through the RFCV 45 to the LP fuel supply.

(B) Failure of a mains FSV 40 in an open condition, such that the cooling flow in pilot-only operation or mains flow in pilot and mains operation is passed into the combustor as a hot streak, with potential to cause damage to the turbine nozzle guide vane.

Considering first failure mode (A), during pilot-only operation, a blockage on the delivery section of the recirculation line can cause a loss of cooling flow and/or pressure in the recirculation line at the burners 33. This potentially allows combustion gases to enter the system at the burners and reach the RFRV 45 via the return section of the recirculation line. As a safeguard against this, the staging system 30 may have a first pressure sensor 50 on the branch pipe 44. The first pressure sensor is preferably located adjacent the RFRV 45 so that any combustion gas entering the system has to displace more fuel before reaching the sensor. This can give the sensor enough time to react to the blockage conditions and alert the EEC before exposing the sensor to combustion gases. The RFRV has an additional position that can block flow through the RFRV to the fuel supply system pumping unit (via the LP return at the pressure raising orifice 47). If the first pressure sensor indicates a blockage, the EEC can thus close the RFRV. A proximity sensor 51 on the RFRV can provide feedback to the EEC to confirm closure of the RFRV and also to alert the EEC to failure of the RFRV.

Also during pilot-only operation, a blockage on the return section of the recirculation line can lead to an increased pressure in the recirculation line producing unscheduled opening of the mains FSVs 40. As a safeguard against this, the system may have a second pressure sensor 52 located on the delivery pipe 41 between the FRCV 42 and the recirculation manifold 43. In particular, if the second pressure sensor detects a pressure increasing to above $P_c$ (combustion chamber pressure) plus the cracking pressure of the mains FSVs 40, the EEC can command closure of the FRCV. Such a blockage may also be detected by a drop in pressure sensed at the first pressure sensor 50 from $P_m$ to $P_{lp}$. However, this detection is only possible if the blockage occurs upstream of the first pressure sensor.

Turning then to failure mode (B), this can be detected during steady state and transient operation by detection of changes in engine control system response, or by measurement of changes in fuel system pressure. Either approach can be used in isolation to detect a failure or together for more robust detection.

Figure 3:
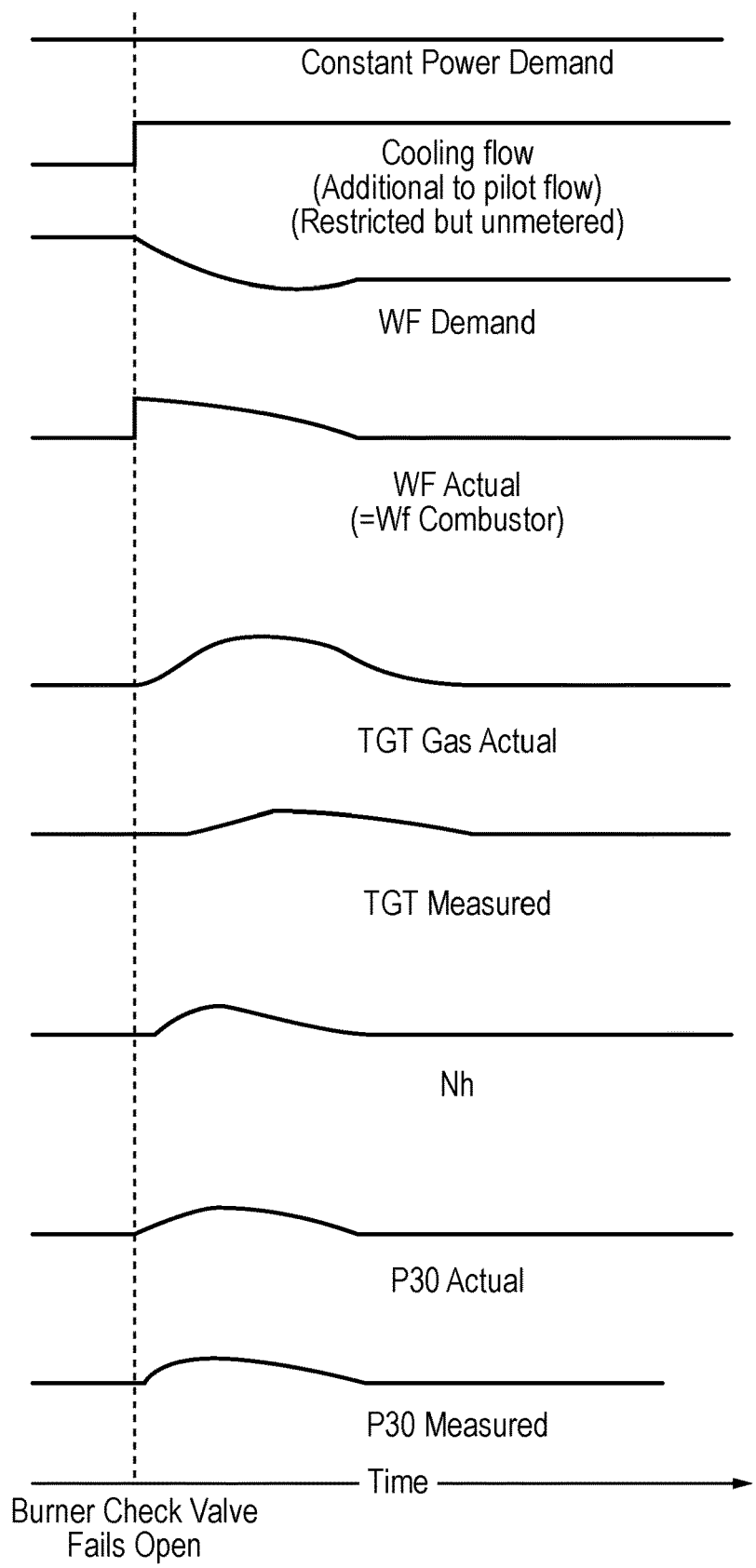
FIG. 3 shows schematic plots of various engine responses against time for a period of constant power demand from the engine electronic controller (EEC) during pilot-only operation.

Considering changes in engine control system response, FIG. 3 shows schematic plots of various engine responses against time for a period of constant power demand from the EEC during pilot-only operation, Cooling flow being an additional unmetered cooling flow into the combustor through a failed mains FSV 40, WF Demand being the actual metered fuel flow demanded by the EEC, WF Actual (=Wf Combustor) being the actual fuel flow into the combustor, TGT Gas Actual being an actual gas temperature in the turbine, TGT Measured being the corresponding measured gas temperature in the turbine, Nh being the rotation speed of the HP engine spool, P30 Actual being the actual HP compressor exit pressure, P30 Measured being the corresponding measured HP compressor exit pressure.

Figure 4:
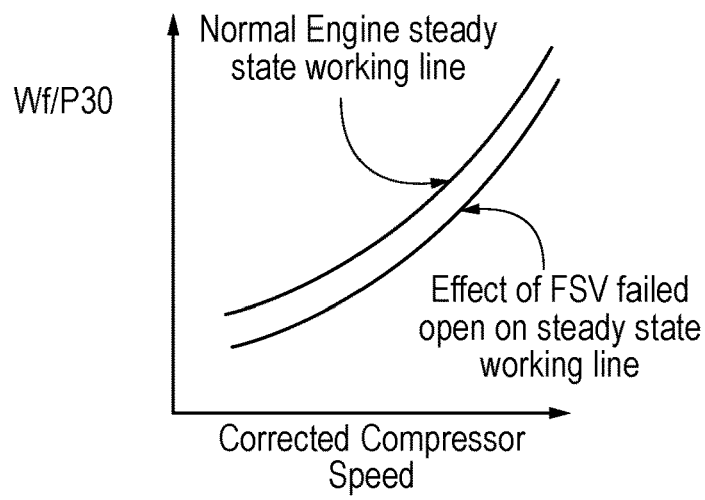
FIG. 4 shows schematically working lines for a normal engine steady state operation and for operation with a failed open fuel flow scheduling valve (FSV)

On failure of the FSV 40, an increased fuel flow Wf Actual into the engine occurs, causing an increase in speed Nh requiring control law action by the EEC to reduce WF Demand. In the absence of such a failure, normal engine control has a Wf/P30 relationship as illustrated by the working line in FIG. 4. However, under the failure, the P30 delivery pressure is unchanged at a given speed while WF Demand is reduced, implying a net effect as perceived by the control system of apparently moving the Wf/P30 relationship down, as shown in FIG. 4. Additionally, unlike the cooling flow blockage failure, a change in TGT profile can be detected after a period that exceeds the sensor time constant.

Accordingly, during steady state operation under pilot-only operating mode, the EEC applies the following algorithm:

1) If an engine rotor starts to accelerate at a nominally constant fuel flow, this is the entry condition for consideration of an FSV failure.
2) The engine control system maintains a map of the WF/P30 steady state working line, within the flight, across a number of flights and/or across full service operation.
3) The engine continues to accelerate after fuel flow is reduced by control law action.
4) On return to steady state control the step change in WF/P30 indicates a failure.
5) Optionally, at a time period dependent on the thermal time constant of the TGT measurement system and layout of the TGT sensors, a hot streak can also be detected.

Figure 5:
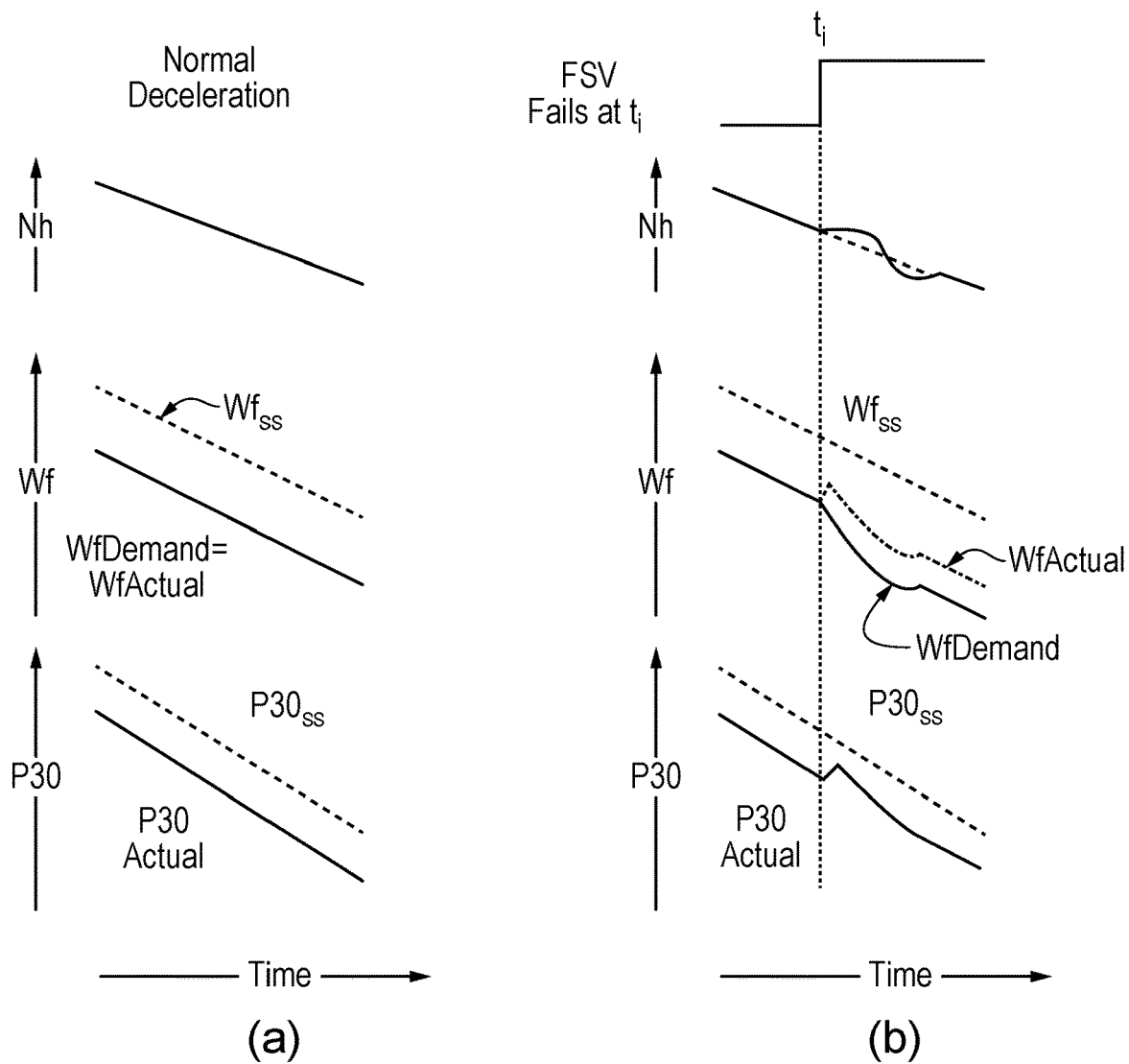
FIG. 5 shows responses of Nh, Wf and P30 under pilot-only operating mode for (a) a normal deceleration, and (b) a deceleration during which an FSV fails open at time $t_f$, the subscript SS indicating steady state.

For transient response operations, further considerations are taken into account. Thus FIG. 5 shows responses of Nh, Wf and P30 under pilot-only operating mode for (a) a normal deceleration, and (b) a deceleration during which an FSV fails open at time $t_f$, the subscript SS indicating steady state. During deceleration under pilot-only operating mode, the EEC applies the following algorithm:

1) If an engine rotor deceleration starts to reduce or stagnates with a reducing fuel flow prior to reaching the demanded power condition (or the roll off point for a damped control response), this is the entry condition for consideration of the failure.
2) The engine control system detects an excursion on WF/P30 during the transient relative to Wf Demand characteristics.
3) The engine deceleration rate continues to fall even after fuel flow demand is reduced by control law action.

The effect on operation during an acceleration transient under pilot-only operating mode is that the additional fuel flow through the failed FSV will result in an unexpected increase in acceleration and a corresponding unexpected reduction in fuel flow demand by the control laws to observe the acceleration control limits. In the extreme case, this can potentially set the Wf demand at less than Wf Steady State for the power setting.

Thus in the three scenarios discussed above (steady state, deceleration transient and acceleration transient), a common factor in the algorithms applied by the EEC is detection of a measured increase in the second derivative of Nh relative to that of the predicted Nh profile for the Wf demand. The FSV failure is then confirmed by also detecting a reduction in the ratio of Wf demand to measured P30 relative to the predicted ratio. Requiring these two independent measurements improves the reliability of FSV leakage detection.

Having detected an FSV failure, the EEC can then command closure of the recirculation line e.g. by closing off the FRCV 42 and the RFRV 45.

Figure 6:
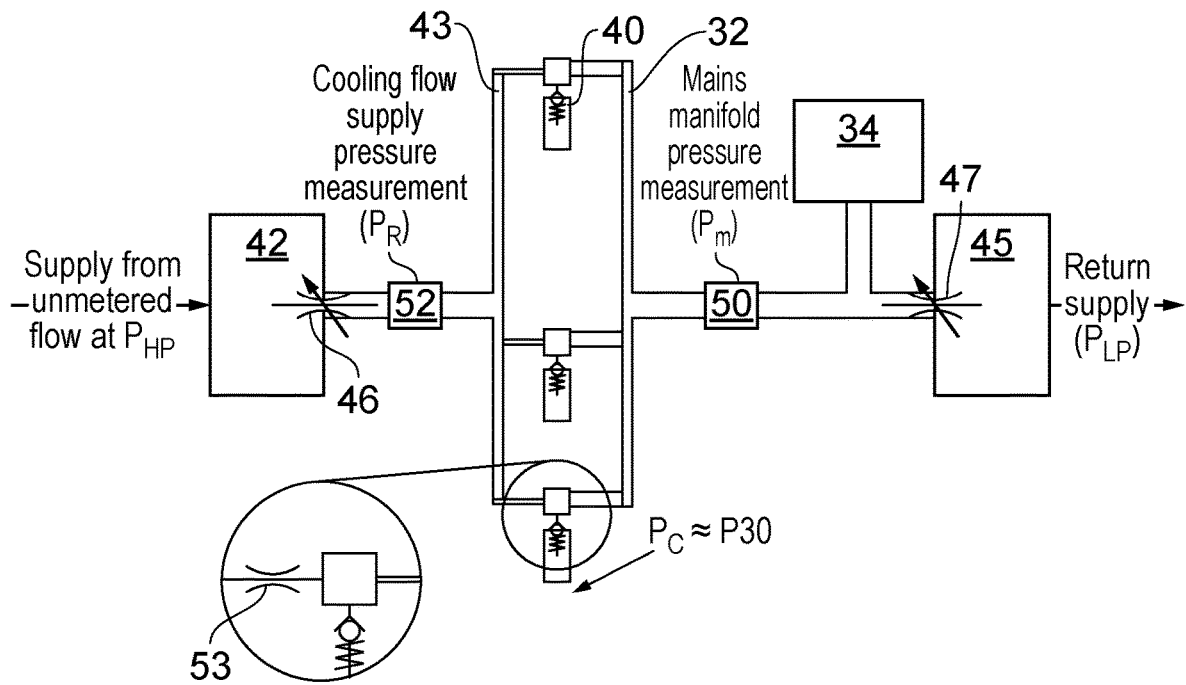
FIG. 6 shows schematically the recirculating cooling flow of the staging system during pilot-only operation.

Considering next changes in fuel system pressure, FIG. 6 shows schematically the recirculation line of the staging system 30 during pilot-only operation. The reference numbering of features in FIG. 6 corresponds to the numbering used in FIG. 2. Each mains FSV 40 (only three shown in FIG. 6) is connected to the recirculation manifold 43 by a pigtail or other restrictive connection 53, and receives a split of the cooling flow. The following properties are present:

1) Pressure in the mains manifold ($P_m$)=Pressure from the cooling flow supply ($P_R$) when the fuel flow through the CFO 46 is choked.
2) If the flow through the CFO 46 is not choked then:
   a) The cooling flow supply will maintain $P_m$>Pressure at LP Pump outlet ($P_{LP}$), and
   b) $P_m$ may be <$P_R$ due to pressure drop across the pigtails 53. However, due to relative areas can still have the property $P_m = P_R$.
3) Incompressible flow requires that $Wf_{pt}$ (=$\Sigma Wf_{pti}$)= $Wf_{RFRV}$, where $Wf_{pt}$ is the total flow through the pigtails, $Wf_{pti}$ is the flow through an individual pigtail, and $Wf_{RFRV}$ is the flow through the RFRV 45. The flow is not choked through the pigtails 53.
4) The area for the full set of pigtail cooling flows $A_{pt}=\Sigma A_{pti}$ is greater than the area $A_{PRO}$ of the PRO 47, otherwise $Wf_{RFRV}$ will be $Wf_{pt}$ at equilibrium, and $P_M$ will be only slightly greater than $P_{LP}$, which is clearly less than $P_C$—leading to combustion gas ingestion into the manifold. $A_{pt}$ is also constant. Suitable discharge coefficients for the pigtails are known to the skilled person, but can be neglected in the present analysis.
5) $P_R$ and $P_m$>$P_C$, otherwise the mains FSVs 40, which are not airtight, will leak combustion gases into the mains manifold 32.
6) $P_R$<$P_C$+Pressure of mains FSV cracking pressure ($P_{FSVCP}$), otherwise additional fuel will leak into the combustion chamber.

Figure 7:
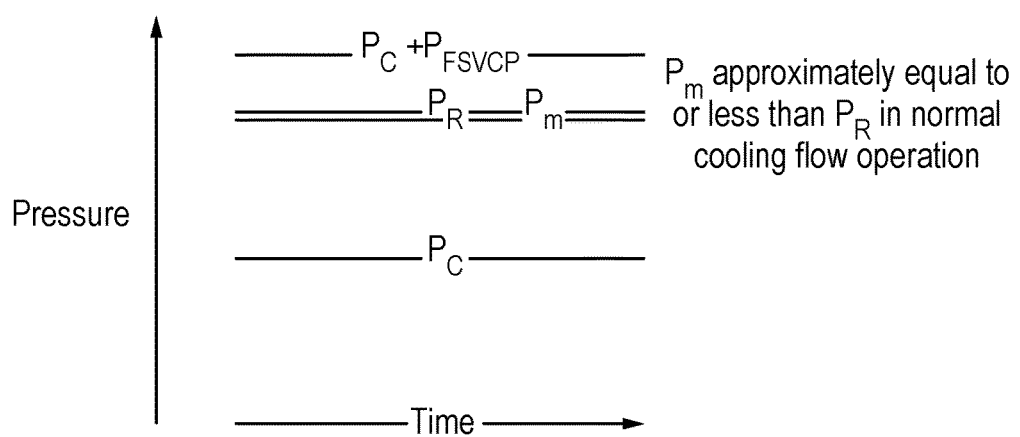
FIG. 7 shows pressure properties of the recirculation line of the staging system for normal pilot-only operation.

The above pressure properties for $P_R$ and $P_m$ are illustrated in FIG. 7 for normal pilot-only operation.

Figure 8:
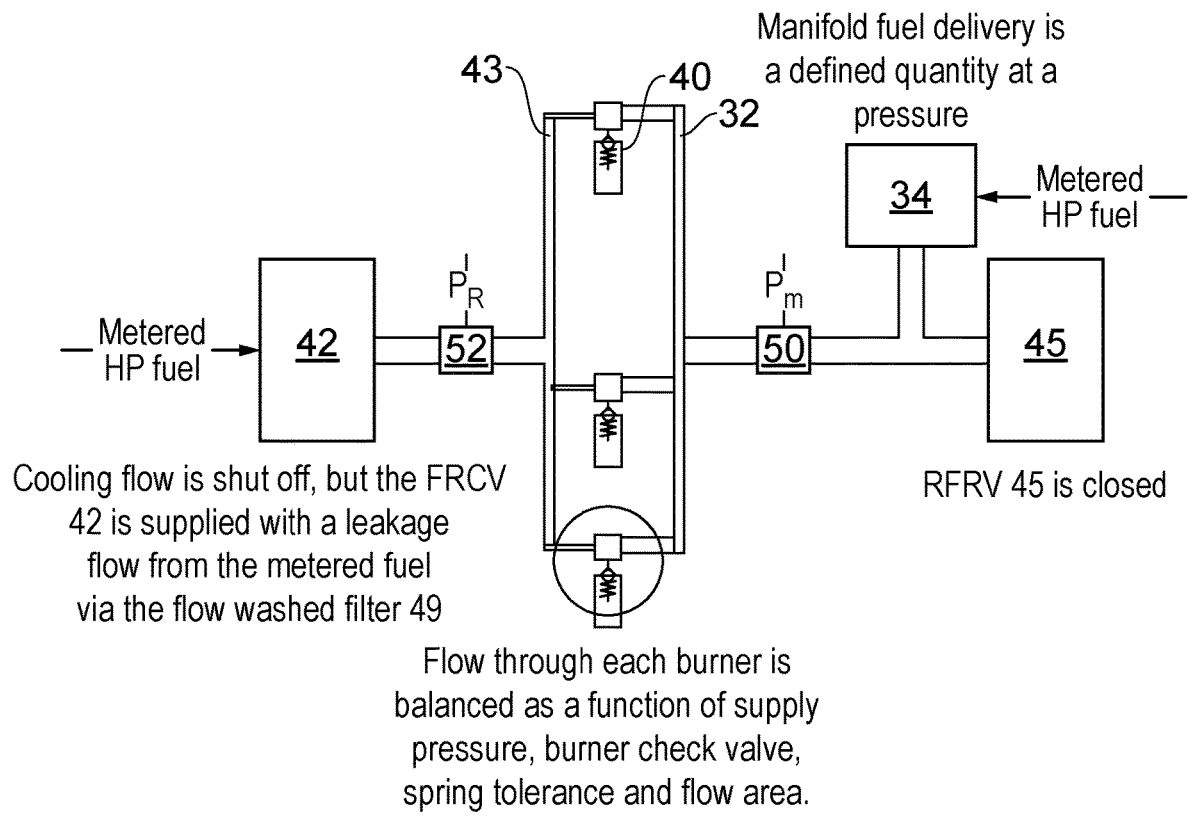
FIG. 8 shows schematically the recirculation line of the staging system during pilot and mains operation.

Next, FIG. 8 shows schematically the recirculation line of the staging system 30 during pilot and mains operation. The reference numbering of features in FIG. 8 corresponds to the numbering used in FIGS. 2 and 6. The following properties are present:

1) $P_m$ is greater than or equal to $P_C+P_{FSVCP}$+the back pressure $P_{Spr}$ provided by the spring within each FSV 40 to balance flows between the burners when the FSV is open.
2) The cooling flow is shut off, but the recirculation line is supplied with a small leakage flow from the flow washed filter 49 such that the line is maintained full and $P_R$ is equivalent to $P_m$. The leakage flow is from metered fuel and does not impact engine operation.

Figure 9:
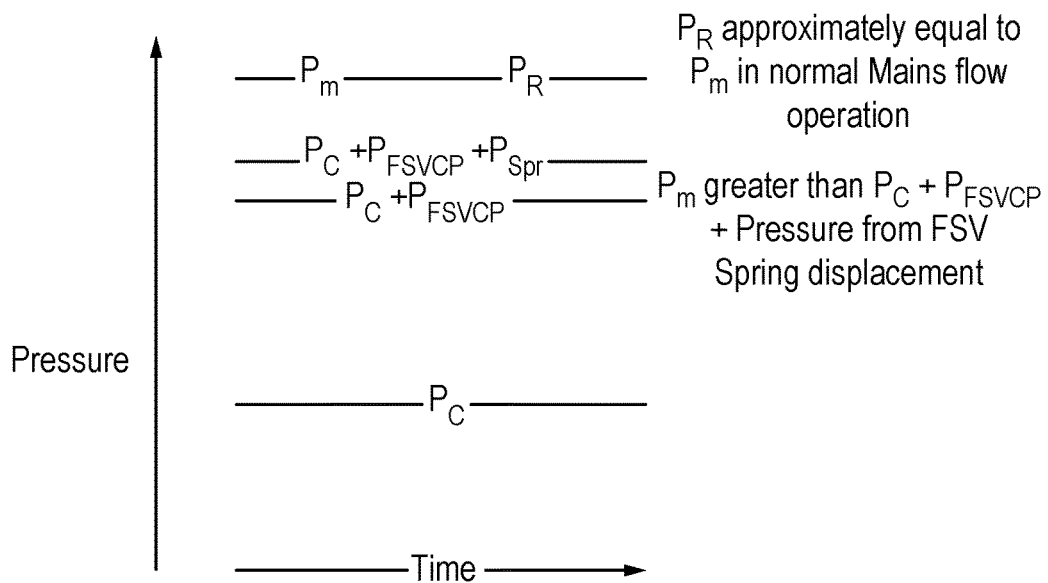
FIG. 9 shows pressure properties of the recirculation line of the staging system for normal pilot and mains operation

The above pressure properties for $P_R$ and $P_m$ are illustrated in FIG. 9 for normal pilot and mains operation.

Accordingly, with reference to FIGS. 6 to 9, the following failure scenarios can be identified.

1) When the mains manifold 32 is staged out (pilot-only operation):
   a) Within a single burner "i" the area of failure is small enough such that the cooling flow to the burner ($Wf_{pti}$) can maintain the fuel flow burner pressure at >$P_c$. $Wf_{bi}$<$Wf_{pti}$.
   b) Within a single burner "i" the flow $Wf_{bi}$>$Wf_{pti}$, and $Wf_{bi}$<$\Sigma Wf_{pti}$, such that the flow for the failed burner is greater than can be met by the cooling flow for the burner, but less than the full cooling flow.
   c) Within a single burner "i" flow ($Wf_{bi}$)>$\Sigma Wf_{pti}$=$Wf_{pt}$, such that the flow for the failure is greater than that provided by the $Wf_{FRCV}$.
2) When the mains manifold 32 is staged in (pilot and mains operation):
   a) A burner fails with an area that is equivalent to the nominal flow allocation for that burner.
   b) A burner "i" fails with an area $A_{ix}$, less than a threshold, which will cause an imbalance between burners, but will not prevent fuel flow through any single burner.
   c) A burner "i" fails with an area $A_{iy}$, greater than a threshold (e.g. fails wide open) that implies the metered flow is not sufficient to maintain pressure in all remaining burners at greater than $P_C+P_{FSVCP}$, such that one or more burner FSVs close.

Each of these scenarios can be treated in turn:

1) a) In this scenario, $P_R$ is maintained such that there is a reduction in the flow through the RFRV 45, implying $P_m$ is reduced by nominally the flow rate through the failed FSV. This will either be within tolerance of measurement accuracy (e.g. at low altitude) or detectable by the relative change in manifold cooling flow (e.g. at high altitude). This can be considered as a syphon effect where the syphon has developed a leak at a point above the supply and return.

1) b) In this scenario, $\Sigma Wf_{pti}$>=$Wf_{bi}$ and the effect on $P_m$ is that $P_m$ reduces relative to $P_R$, but typically at a detection level that is not within the tolerance of measurement accuracy. Nonetheless, the detection of the failed FSV based on the reduction in $P_m$ and $P_R$ can be used by the EEC to command closure of the recirculation line.

Figure 10:
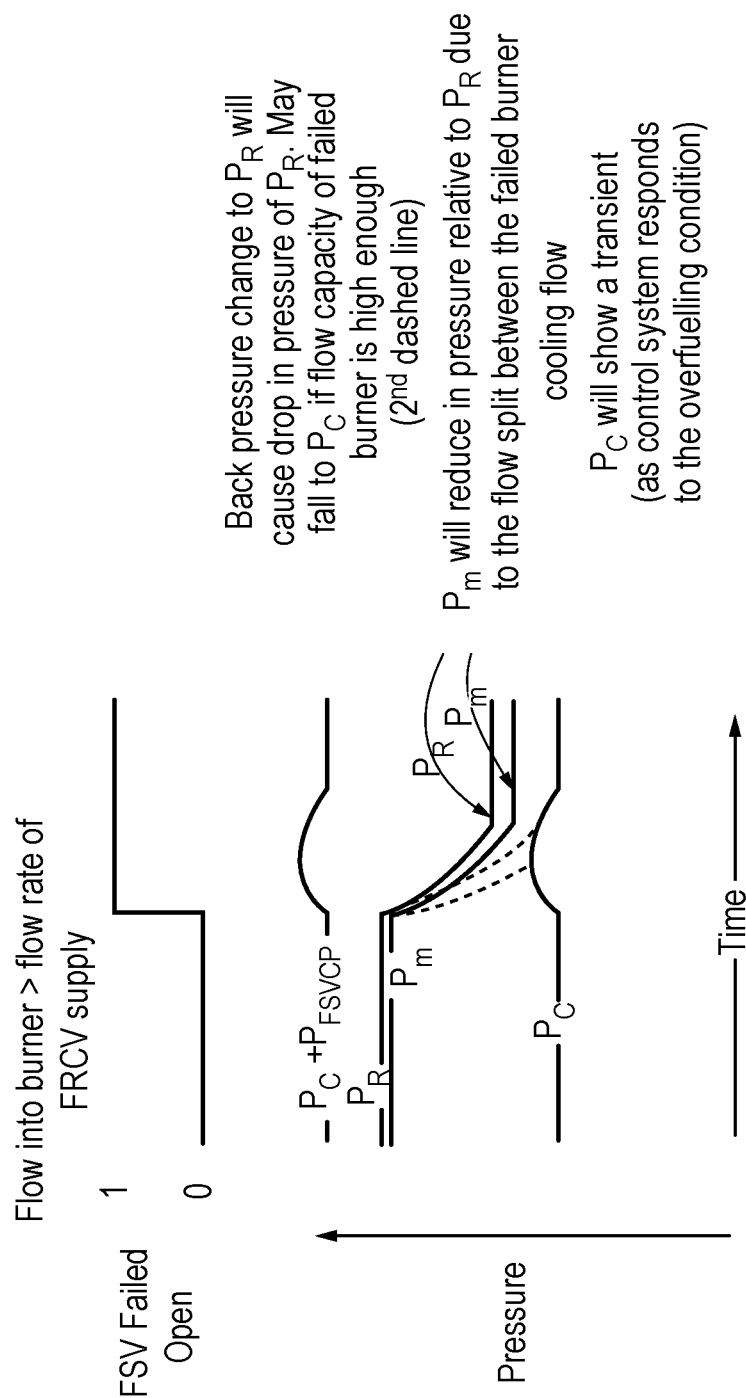
FIG. 10 shows pressure properties of the recirculation line of the staging system for pilot-only operation when an FSV fails open.

1) c) In this scenario, $\Sigma Wf_{pti}$<$Wf_{bi}$ and the effect on $P_m$ is that $P_m$ reduces relative to $P_R$, effectively down to $P_C$ as illustrated in FIG. 10. The detection of the failed FSV based on the reduction in $P_m$ and $P_R$ can again be used by the EEC to command closure of the recirculation line.

2) a) In this scenario, the FSV would have to fail to a condition such that fuel flow through the burner is approximately equal to the share of fuel expected. However, the flow through the burner is a function of area and back pressure from the FSV spring pressure, implying that on failing open the overall back pressure on the fuel would be reduced by the FSV failure. This means to get the equivalent flow for an orifice, the FSV would have to jam open at an over-closed condition relative to the point of failure. This is not considered feasible as there is no additional force available to move the FSV to a less open position than present during normal operation against the mains fuel pressure.

2) b) In this scenario, the leakage flow from the flow washed filter 49 does not cover the additional flow requirement for the failed burner, such that the supply to the other (correctly operating) burners and associated pressure in the manifold is impacted. The configuration has the following properties that can be detected by the $P_R$ and $P_m$ pressure measurements:
   i) The failed burner no longer provides a back pressure from the FSV of cracking pressure+spring displacement, such that the overall back pressure component on the mains manifold delivery is reduced.
   ii) The failed burner FSV consequently has an increased flow that is purely a function of area and discharge coefficient.
   iii) The FFSV 34 sets a metered flow that is effectively constant due to its spool position and HP fuel delivery pressure such that the same flow is maintained initially.

iv) The increased flow through the failed FSV propagates as a reduction in pressure to the other burners that is matched by a reduction in FSV spring loading and displacement on those burners. Thus the event increases the hot streak from the failed burner by reducing the flow through the other burners.

v) The reduction in spring loading from the operating burners also reduces the pressure in the mains manifold 32.

vi) The manifold configuration implies that the top burner pressure reduces most, relative to the location of the failed FSV.

Figure 11:
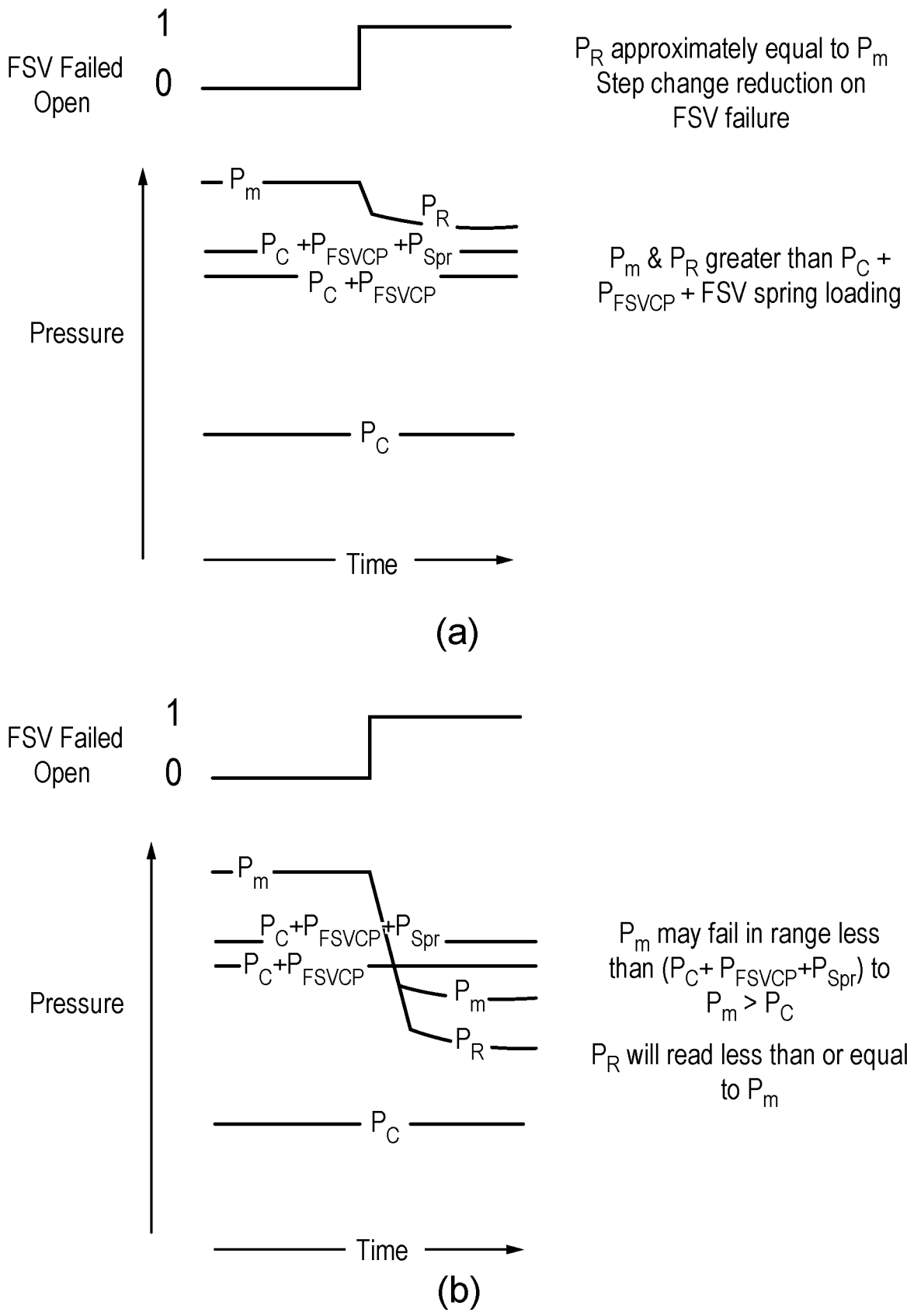
FIG. 11 shows pressure properties of the recirculation line of the staging system for pilot and mains operation when an FSV (a) fails open with an area, less than a threshold, which will cause an imbalance between burners, and (b) fails wide open.

The effect on $P_m$ and $P_R$ is illustrated in FIG. 11(a). The failed FSV leads to a similar drop in both these pressures.

2) c) In this scenario, the flow through the failed FSV reduces the pressure in the mains manifold 32 such that one or more correctly operating FSVs shut. The effect on $P_m$ and $P_R$ is illustrated in FIG. 11(b). The failed FSV leads to a bigger drop in both these pressures, with $P_R$ reading equal to or less than $P_m$.

The detection of a failed FSV 40 in these scenarios by measurement of $P_m$ and $P_R$ applies to steady state engine operation as well as acceleration and deceleration transients. In particular, during an acceleration or deceleration transient, the response of $P_m$ and $P_R$ is referenced to a moving measure of $P_C$ and detection is synchronised relative to sample times within the EEC.

Having detected a failed FSV during pilot and mains operation, the EEC can issue an alert signal that a check valve has failed open, advising the pilot to pull back the engine and/or turn mains off (i.e. switch to pilot-only operation).

The failed FSV can lead to a reduction in measured P30 pressure e.g. due to the localised flow increase through the failed burner, or reduction of flow in the other burners with a corresponding drop in combustion gas pressure. Thus the EEC can be adapted to issue the alert only when the detection based on fuel pressure measurement is supplemented by a corresponding reduction in the measured P30, or by a change in the ratio of the metered fuel flow to the measured P30 relative to a predicted ratio of the metered fuel flow to the gas pressure in the combustor, i.e. to an apparent moving of the Wf/P30 relationship upward.

Advantageously, the approaches to detection of a failed FSV described above are not dependent on single path solutions. Rather they use robust detection mechanisms based on detectable properties of the engine control system software and fuel system measurements. More particularly, they use time-dependent data that are available on the engine as part of the EEC control system, and that can be synchronised against each other based on known sample rates and physical transfer times. Moreover, the measurements on which detection is based are dynamic and/or sensitive and have short time constants for detection.

An additional sensor may be provided at the top of the mains manifold. Notwithstanding the high temperature environment with potential cooling challenges the placement of a pressure sensor at this position would simplify the detection solution as the reduction in pressure at the top of the manifold will be clearly indicated without consideration of head effects due to manifold geometry.

While the invention has been described in conjunction with the exemplary embodiments described above, many equivalent modifications and variations will be apparent to those skilled in the art when given this disclosure. For example, it can be extended to systems having more manifolds by the use of pressure sensors on each manifold.

Although described above in relation to an aero gas turbine engine, the invention can also be applied to other types of engine, such as gas pumping (industrial) gas turbine engines and marine gas turbine engines. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A combustion staging system for fuel burners of a multi-stage combustor of a gas turbine engine, the system comprising:

a pilot fuel manifold and a mains fuel manifold respectively distributing fuel to pilot and mains stages of the burners;

a plurality of check valves through which the mains fuel manifold feeds fuel to respective one of the fuel burners, the plurality of check valves being arranged to open when a fuel pressure within the mains fuel manifold exceeds a predetermined fuel pressure relative to gas pressure in the combustor;

a splitting unit which receives a metered fuel flow and controllably splits the metered fuel flow into a pilot fuel flow and a mains fuel flow which are sent respectively to the pilot fuel manifold and the mains fuel manifold to perform staging control of the combustor, the splitting unit being operable to select the pilot fuel manifold and to deselect the mains fuel manifold for pilot-only operation in which there is the pilot fuel flow to the combustor but none of the mains fuel flow to the combustor from the fuel burners, and being operable to select both the pilot fuel manifold and the mains fuel manifold for pilot and mains operation in which there are the pilot fuel flow and the mains fuel flow to the combustor from the fuel burners; and a cooling flow recirculation line having a delivery section arranged to provide a cooling flow of the fuel to the mains fuel manifold after being deselected so that the mains fuel manifold after being deselected remains primed with relatively cool fuel, and a return section arranged to collect the cooling flow from the mains fuel manifold, the cooling flow entering the delivery section from a high pressure fuel zone of the gas turbine engine and exiting the return section to a low pressure fuel zone of the gas turbine engine;

wherein the system further comprises:

a first fuel pressure sensor which measures a fuel pressure in the return section, and a second fuel pressure sensor which measures a fuel pressure in the delivery section; and a control unit which:

when the mains fuel manifold is deselected for the pilot-only operation, (i) performs a comparison of the fuel pressure in the return section that is measured by the first fuel pressure sensor with the fuel pressure in the delivery section that is measured by the second fuel pressure sensor, and (ii) is adapted to close off the recirculation line from the low pressure fuel zone when a result of the comparison is indicative of leakage of the fuel of the cooling fuel flow into the combustor through one or more check valves of the plurality of check valves; and when the mains fuel manifold is selected for the pilot and mains operation, (i) monitors the fuel pressure in the return section and/or the fuel pressure in the delivery section, and (ii) is adapted to issue an alert signal that a check valve of the plurality of check valves has failed open when the fuel pressure measured by the first sensor and/or the fuel pressure measured by the second sensor is indicative of failure of the check valve to regulate the mains fuel flow into the combustor.

2. A combustion staging system according to claim 1, wherein the result of the comparison indicative of leakage is a reduction by more than a predetermined amount of the fuel pressure in the return section relative to the fuel pressure in the delivery section.

3. A combustion staging system according to claim 1, wherein the indication of the check valve failure is a reduction by more than a predetermined amount of the fuel pressure measured by the first sensor and/or the fuel pressure measured by the second sensor.

4. A gas turbine engine having the combustion staging system according to claim 1.

5. A combustion staging system for fuel burners of a multi-stage combustor of a gas turbine engine, the system comprising:

a pilot fuel manifold and a mains fuel manifold respectively distributing fuel to pilot and mains stages of the burners;

a plurality of check valves through which the mains fuel manifold feeds fuel to the respective on of the fuel burners, the plurality pf check valves being arranged to open when a fuel pressure within the mains fuel manifold exceeds a predetermined fuel pressure relative to gas pressure in the combustor;

a splitting unit which receives a metered fuel flow and controllably splits the metered fuel flow into a pilot fuel flow and a mains fuel flow which are sent respectively to the pilot fuel manifold and the mains fuel manifold to perform staging control of the combustor, the splitting unit being operable to select the pilot fuel manifold and to deselect the mains fuel manifold for pilot-only operation in which there is the pilot fuel flow to the combustor but none of the mains fuel flow to the combustor from the fuel burners, and being operable to select both the pilot fuel manifold and the mains fuel manifold for pilot and mains operation in which there are the pilot fuel flow and the mains fuel flow to the combustor from the fuel burners; and a cooling flow recirculation line having a delivery section arranged to provide a cooling flow of the fuel to the mains fuel manifold after being deselected so that the mains fuel manifold after being deselected remains primed with relatively cool fuel, and a return section arranged to collect the cooling flow from the mains fuel manifold, the cooling flow entering the delivery section from a high pressure fuel zone of the gas turbine engine and exiting the return section to a low pressure fuel zone of the gas turbine engine;

wherein the system further comprises;

a first fuel pressure sensor which measures a fuel pressure in the return section, and a second fuel pressure sensor which measures a fuel pressure in the delivery section;

a gas pressure sensor configured to measure the gas pressure in the combustor; and a control unit, which:

when the mains fuel manifold is deselected for the pilot-only operation, (i) performs a comparison of the fuel pressure in the return section that is measured by the first fuel pressure sensor with the fuel pressure in the delivery section that is measured by the second fuel pressure sensor, and (ii) is adapted to close off the recirculation line from the low pressure fuel zone when a result of the comparison is indicative of leakage of the fuel of the cooling fuel flow into the combustor through one or more check valves of the plurality of check valves and the result of the comparison indicative of the leakage is supplemented by a corresponding indication of the leakage from a reduction in the gas pressure or from a comparison of the gas pressure with a predicted gas pressure for the metered fuel flow; and when the mains fuel manifold is selected for the pilot and mains operation, (i) monitors the fuel pressure in the return section and/or the fuel pressure in the delivery section, and (ii) is adapted to issue an alert signal that a check valve of the plurality of check valves has failed open when the fuel pressure measured by the first sensor and/or the fuel pressure measured by the second sensor is indicative of failure of the check valve to regulate the mains fuel flow into the combustor.

6. A combustion staging system for fuel burners of a multi-stage combustor of a gas turbine engine, the system comprising:

a pilot fuel manifold and a mains fuel manifold respectively distributing fuel to pilot and mains stages of the burners;

a plurality of check valves through which the mains fuel manifold feeds fuel to respective one of the fuel burners, the plurality of check valves being arranged to open when a fuel pressure within the mains fuel manifold exceeds a predetermined fuel pressure relative to gas pressure in the combustor;

a splitting unit which receives a metered fuel flow and controllably splits the metered fuel flow into a pilot fuel flow and a mains fuel flow which are sent respectively to the pilot fuel manifold and the mains fuel manifold to perform staging control of the combustor, the splitting unit being operable to select the pilot fuel manifold and to deselect the mains fuel manifold for pilot-only operation in which there is the pilot fuel flow to the combustor but none of the mains fuel flow to the combustor from the fuel burners, and being operable to select both the pilot fuel manifold and the mains fuel manifold for pilot and mains operation in which there are the pilot fuel flow and the mains fuel flow to the combustor from the fuel burners; and a cooling flow recirculation line having a delivery section arranged to provide a cooling flow of the fuel to the mains fuel manifold after being deselected so that the mains fuel manifold after being deselected remains primed with relatively cool fuel, and a return section arranged to collect the cooling flow from the mains fuel manifold, the cooling flow entering the delivery section from a high pressure fuel zone of the gas turbine engine and exiting the return section to a low pressure fuel zone of the gas turbine engine;

wherein the system further comprises:

a first fuel pressure sensor which measures a fuel pressure in the return section, and a second fuel pressure sensor which measures a fuel pressure in the delivery section;

a speed sensor which measures a rotation speed of a rotor of the engine; and a control unit, which:

when the mains fuel manifold is deselected for the pilot-only operation, (i) performs a comparison of the fuel pressure in the return section that is measured by the first fuel pressure sensor with the fuel pressure in the delivery section that is measured by the second fuel pressure sensor, and (ii) is adapted to close off the recirculation line from the low pressure fuel zone when a result of the comparison is indicative of leakage of the fuel of the cooling fuel flow into the combustor through one or more check valves of the plurality of check valves, and the result of the comparison indicative of the leakage is supplemented by a corresponding indication of the leakage from a comparison of the rotation speed with a predicted rotation speed for the metered fuel flow; and when the mains fuel manifold is selected for the pilot and mains operation, (i) monitors the fuel pressure in the return section and/or the fuel pressure in the delivery section, and (ii) is adapted to issue an alert signal that a check valve of the plurality of check valves has failed open when the fuel pressure measured by the first sensor and/or the fuel pressure measured by the second sensor is indicative of failure of the check valve to regulate the mains fuel flow into the combustor.

\* \* \* \* \*